1

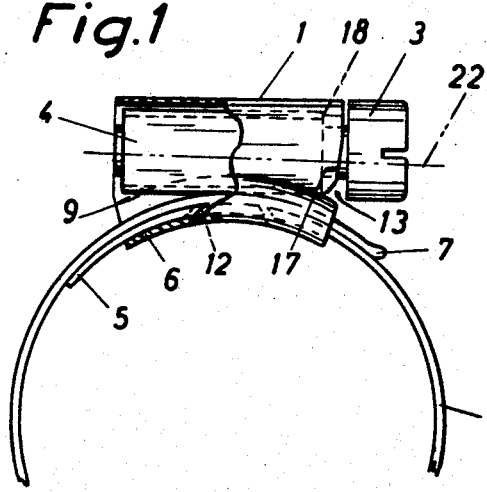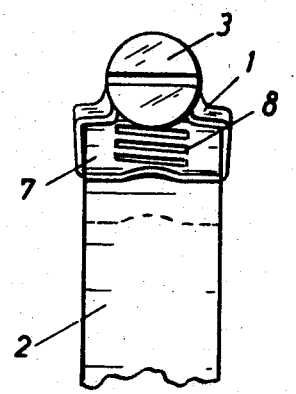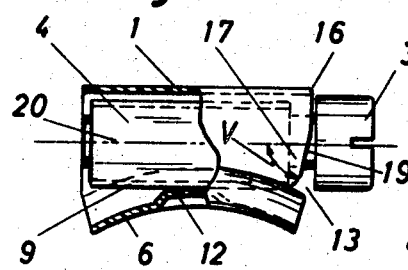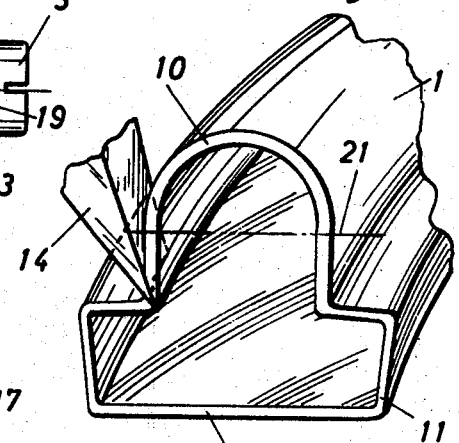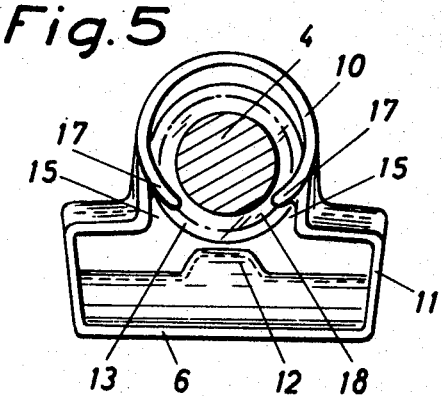
KARL ERIK LENNART BERGSTROM,
INVENTOR.
Attorneys United States Patent Office 3,521,334
Patented July 21, 1970

3,521,334
HOSE CLAMP
Karl Erik L. Bergström, Scheelegatan 28,
Stockholm, Sweden
Filed Nov. 26, 1968, Ser. No. 779,067
Claims priority, application Sweden, Dec. 4, 1967,
16,589/67
Int. Cl. B65d 63/00
U.S. Cl. 24—274                                   2 Claims

ABSTRACT OF THE DISCLOSURE

This invention relates to a hose clamp of the kind comprising a steel band bent to form a ring and having end portions overlapping each other, the radially outer end having external and transversal threads meshing with the threads of a screw provided with a head and a groove inside the latter, said screw being carried for rotation but axially undisplaceable in a sleeve which has one portion partly enclosing the screw and being shaped essentially as half a hollow-cylinder and one portion enclosing the two band ends and having a substantially rectangular cross section, the inner band end adapted to be arranged at the bottom of the rectangular sleeve portion, the latter having a space rendering possible the displacement of the outer steel band end between the inner band end and the screw by means of a rotation of the latter. The main object of the invention is to provide a clamp of this kind which is easily manufactured and in which the screw is retained with safety and screw will be ensured a meshing with the screw threads of the other band end. This has been achieved by providing the sleeve at the end turned towards the screw head with cuttings at the places where the hollow-cylindrical sleeve portion continues in the rectangular sleeve portion, the free ends of the tongues of the hollow-cylindrical portion thus freed from the rectangular portion being bent inwards and into the groove in the screw, these ends further being bent in such a way that the sleeve end situated closest to the screw head near the tongues will be less projecting than at the portion of this sleeve end situated farmost from the sleeve bottom.

The present invention relates to hose clamps of the kind comprising a steel band bent to form a ring and having end portions overlapping each other, the radially outer end on the external side having transverse treads for engagement with the threads on a headed screw, the latter having inside its head a peripheral notch, said screw being rotatable but axially undisplaceably mounted in a sleeve. This sleeve has a portion which partly encloses the screw and which is shaped as approximately half a hollow cylinder and a portion enclosing the two steel band ends and having an essentially rectangular cross section, the inner steel band end adapted to be arranged at the bottom of said rectangular portion. The sleeve has a space which renders possible the displacement of the outer band end between the inner band end and the screw at the rotation of the latter. From the Swedish Pat. No. 150,210 it is known, in such hose clamps, to prevent, by pressing in a part of the hollow cylinder wall of the sleeve into the screw notch behind the head, an axial displacement of the screw but still permit its rotation. Said pressed-in portion of the sleeve end close to the screw head does not give the desired stabilisation of the screw in radial direction. It is desired to increase the tension resistance of the hose clamp by means of simple means.

This is possible to obtain according to the Swedish Pat. No. 178,203 by means of an increase of the friction force between on the one hand the two end portions of the steel band and on the other hand the inner end portion and the sleeve bottom. This increased friction force is obtained thereby that the sleeve at the end turned towards the screw head is provided with an axially projecting portion at the portion of the sleeve situated farmost from the sleeve bottom. This projecting portion is adapted, at the tightening of the screw to constitute such a grate against the screw head that the screw is swung with the head closer to the sleeve bottom. The swinging of the screw causes on the one hand that the screw thread on the screw effectively engages the screw threads in the outer end portion of the steel band and on the other hand that this end portion is also pressed with force against the inner end portion and also that this end portion with force is pressed against the sleeve bottom. Due to this increased friction, the stress on a holding abutment arranged in the sleeve bottom for the inner band end is diminished as is also the stress on said band end, in particular at a cross section through the latter extending through a notch in the band end for said abutment. To obtain this axially projecting portion has involved certain difficulties. The projecting portion may either be obtained by grinding away the sleeve walls at the end of the sleeve adjacent the screw head in such a way that an inclining plane is obtained on the hollow cylindrical sleeve portion extending with an acute angle down towards the rectangular sleeve portion housing the steel band ends. Another possibility is to cut off obliquely from the seamless tube comprising the basic material for the sleeve, the tube pieces forming the sleeve ends. However, a difficulty then arises at the insertion of these sleeve ends into the tool of the sleeve forming machine in such a way that the projecting portion on the sleeve end will be situated farmost from the sleeve bottom.

One object of the present invention is to eliminate said difficulties and to render possible a manufacture, in a simple and cheap way, of a hose clamp presenting the same advantages as the hose clamps according to said two patents. The main feature of the invention is to be seen therein that the sleeve at the end turned towards the screw head is provided with cuttings where the hollow-cylindrical sleeve portion continues in the rectangular sleeve portion and that the free end of the tongues thus freed from the hollow-cylindrical portion are bent inwards into the notch in the screw and bent in such a way that the sleeve situated closest to the screw head near the tongues will project less than the portions of this sleeve end situated farmost from the sleeve bottom. The invention simplifies not only the manufacture of the sleeve but also the mounting of the hose clamp considerably as will be obvious from the following. The two mentioned freed and inwards bent tongues of the sleeve end retain the screw axially and due to the sleeve end obtained at the bending inwards of the tongues and inclining downwards and towards the rectangular portion of the sleeve the screw will, when tightened, be swung with its head end down towards the steel band and thereby there will be obtained an increased frictional engagement between the screw and the outer end of the steel band as well as between this end and the sleeve bottom The invention will now be elucidated with reference to the attached drawing. In the drawing:

FIG. 1 is a side elevation, partly cut in longitudinal direction, of a hose clamp in conformity with the invention, FIG. 2 is an end elevation of the hose clamp as seen from the screw head end, FIG. 3 is similar side elevation, partly in longitudinal section, of the sleeve with the screw, FIG. 4 shows on an enlarged scale a diagrammatical view of the end turned towards the screw head of a hose clamp sleeve before the freeing of the two holding tongues, and FIG. 5 is an end elevation of the finished hose clamp showing the screw in cross section.

The hose clamp shown in the drawing comprises a sleeve 1, a steel band 2 and a screw 4 provided with a head 3. The band 2 is bent to form a ring. Its radially inner end portion 5 is attached to the sleeve bottom 6 and its radially outer end portion 7 is externally provided with transversally extending threads 8 meshing with the threads 9 in the screw 4.

The sleeve 1 which in this case is supposed to be manufactured from a seamless tube piece is shaped in such a way that it will comprise a hollow-cylindrical portion 10 enclosing the screw 4, the portion 10 having a portion 11 enclosing the steel band ends 5, 7 and having an essentially rectangular cross section. The bottom 6 is provided with an elongated abutment 12 projecting up and into the rectangular sleeve portion 11. The inner end portion 5 of the band 2 is provided with a notch (not shown) of such dimensions that the abutment 12 may be brought to engagement with the same. The screw 4 is inside the head 3 provided with a peripheral groove 13.

When the band 2 with its ends 5 and 7 have been inserted into the sleeve portion 11 and the band end 5 has been brought to be retained at the sleeve bottom 6 by means of the abutment 12, the screw 4 is inserted into the sleeve portion 10 by means of a rotation, the screw threads thereat being brought to engagement with the screw threads 8 in the outer band end 7. A wedge-shaped tool 14 (only one tool shown in FIG. 4) is then used for cutting slots 15 (see FIG. 5) in the sleeve wall near the end 16 of the sleeve 1 situated closest to the screw head such that holding tongues 17 with the lower ends are freed from the sleeve wall at such places of the sleeves where the hollow-cylindrical sleeve portion 10 continues in the rectangular sleeve portion 11. The tongues 17 are bent with the ends radially into the groove 13 in the screw 4 and thereby prevent the latter from being axially displaced during the rotation. The tongues 17 are not only bent with their free ends in the direction towards each other but also bent axially inwards and towards the wall 18 of the notch 13 situated opposite the head 3. An inclining plane 19 is hereby formed at the end 16 of the sleeve 1, this plane 19 forming an angle V (FIG. 3) with the axis 20 of the screw 4 and extending up to and preferably somewhat beyond the diametrical plane 21 of the sleeve portion 10.

When the screw 4 is tightened and the outer band end 7 is thereby drawn to the right according to FIG. 1, the head 3 is pressed against the sleeve end 16. The screw is thereby swung due the occurring axial forces and due to the inclining plane 19 in such a way that the head approaches the bottom 6 (indicated with dash and dot lines 22). The harder the tightening the more the screw will incline. This causes, as already mentioned in the aforegoing, the outer band end 7 to be pressed with force against the inner band end 5 and the latter will in turn be pressed with force against the bottom 6. It is thereby obtained a strong friction junction. It is further obvious that due to this friction force the stresses on the abutment 12 and on the weakest cross section through the inner band end 5 in front of the notch in the same will be considerably reduced.

When the screw 4 is rotated in the opposite direction it is prevented by the tongues 17 from being screwed out of the sleeve 1. No retaining disk is needed at the end of the screw situated opposite the head 3.

The invention has been described in the aforegoing for purposes of illustration only and is not intended to be restricted by this description or otherwise except as defined in the appended claims. Thus, the claims embrace also such a type of hose clamps as those having a sleeve manufactured from a sheet blank. The inner band end 5 may be attached to the sleeve bottom 6 by means of welding. Further, the inner band end 5 may be provided with punched stop abutments being of substantially triangular shape, these stop abutments catching, in the mounted position of the band 2, in front of and behind the bottom 6 of the sleeve 1.

What I claim is:

1. A hose clamp of the kind comprising a steel band (2) bent to form a ring and having end portions (5, 7) overlapping each other, the radially outer end (7) having external and transversal threads meshing with the threads of a screw (4) provided with a head (3) and a groove (13) inside the latter, said screw (4) being carried for rotation but axially undisplaceable in a sleeve (1) which has one portion (10) partly enclosing the screw and being shaped essentially as half a hollow-cylinder and one portion (11) enclosing the two band ends (5, 7) and having a substantially rectangular cross section, the inner steel band end (5) adapted to be arranged at the bottom (6) of the rectangular sleeve portion (11), the latter having a space rendering possible the displacement of the outer steel band end (7) between the inner band end (5) and the screw (4) by means of a rotation of the latter, wherein the improvement comprises providing the sleeve (1) at the end turned towards the screw head (3) with cuttings (15) at the places where the hollow-cylindrical sleeve portion (10) continues in the rectangular sleeve portion (11), the free ends of the tongues (17) of the hollow-cylindrical portion (10) thus freed from the rectangular portion (11) being bent inwards and into the groove (13) in the screw (4), these ends further being bent in such a way that the sleeve end (16) situated closest to the screw head (3) near the tongues (17) will be less projecting than at the portion of this sleeve end situated farmost from the sleeve bottom (6).

2. A hose clamp as claimed in claim 1, wherein the improvement comprises tongues (17) having a bent portion which extends approximately from the diametric plane of the hollow-cyclindrical sleeve portion (10) to the free ends of the tongues (17) in such a way that the end plane of the sleeve turned towards the screw head (3) at this place will enclose an acute angle (V) with the longitudinal axis (20) of the sleeve.

References Cited

UNITED STATES PATENTS

| 3,203,068 | 8/1965 | Bergstrom | 24—274 |
| 3,371,392 | 3/1968 | Rueckheim | 24—274 |

FOREIGN PATENTS 682,935  11/1952  Great Britain.

DONALD A. GRIFFIN, Primary Examiner